May 10, 1966  V. C. WOODWORTH ETAL  3,250,937
LOW BACKGROUND NUCLEAR RADIATION DETECTOR
Filed Jan. 22, 1962
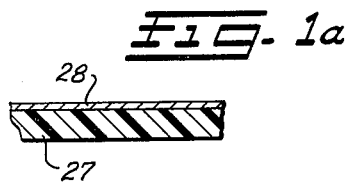
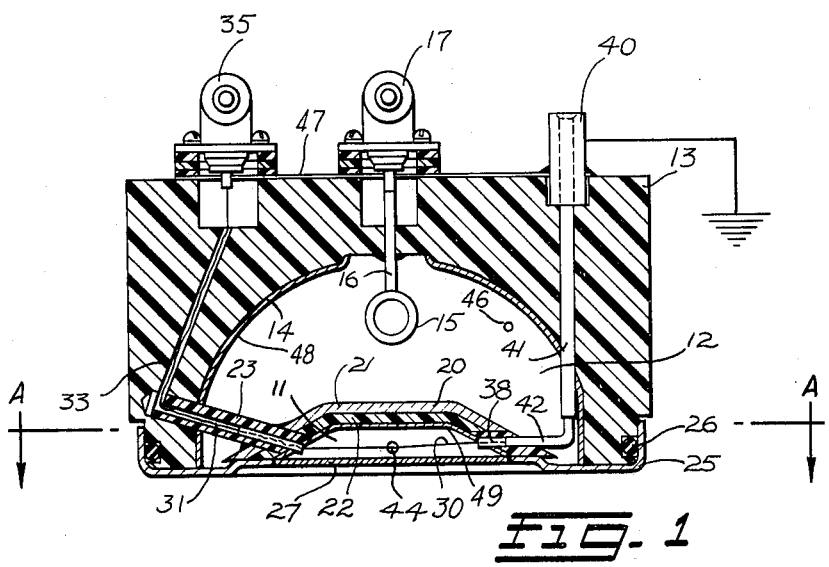
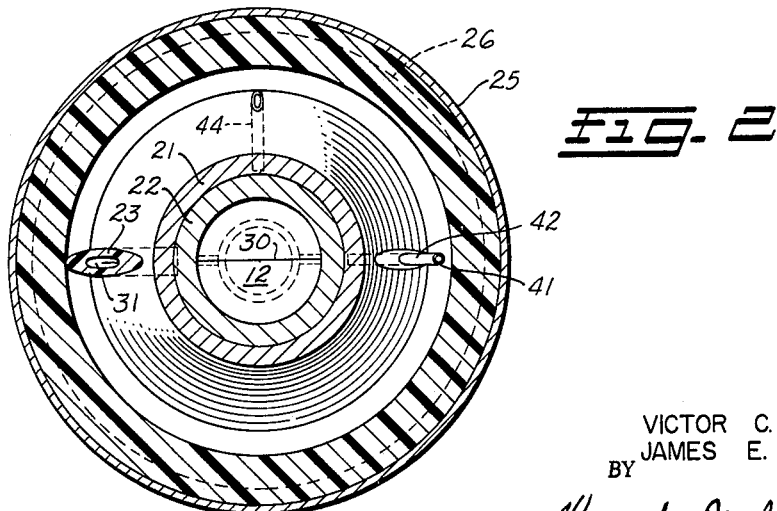
INVENTOR.
VICTOR C. WOODWORTH
JAMES E. LEONE
BY
*Weingarten, Orenbuch & Pandiscio*
ATTORNEYS

United States Patent Office 3,250,937
Patented May 10, 1966

3,250,937
LOW BACKGROUND NUCLEAR RADIATION DETECTOR
Victor C. Woodworth, Needham, and James E. Leone, Quincy, Mass., assignors to Laboratory for Electronics, Inc., Boston, Mass., a corporation of Delaware
Filed Jan. 22, 1962, Ser. No. 167,507
9 Claims. (Cl. 313—93)

This invention relates in general to nuclear radiation detectors and, more particularly, to a gas tube type of detector having particularly low background characteristics.

The evolution of techniques involving the measurement of radioactive materials has led to requirements for increasingly sensitive detectors of the emitted radioactive particles. This is particularly so with reference to beta particles, such as those emitted by carbon 14. The demand for accurate detection and measurement of minute quantities of these radioactive materials stems from the nature of the applications for which the measurements are required. Thus, in tracer techniques the total amount of activity which may be utilized is generally limited by considerations of biological or industrial safety and since many of these applications involve large dilution factors, the ultimate sensitivity of the tracer technique depends upon the sensitivity of the radiation detector employed. The same measurement problems arise in the measurement of contaminant materials from radioactive fallout. This is particularly so when the materials contaminated represent food or drink. Amounts of radioactivity that are minute in terms of the mass of material which they are contaminating become significant in terms of human ingestion because of the cumulative biological effect occasioned by the retention of materials, such as strontium, by the body.

A highly sensitive detector for trace amounts of beta emitting radioactive materials must necessarily have a low natural "background" rate. The background rate of a nuclear detector is the output count rate of the detector when no specific souce of radioactivity is present. In a gas tube detector, that is, a Geiger Mueller tube or a proportional counter tube, several factors contribute to this background rate. These factors are; the inherent radioactive contamination of the materials and gas making up the counter tube itself, the cosmic radiation incident upon the counter tube, and the nuclear radiations incident upon the counter tubes which result from the natural or artificial contamination of materials in the environment of the counter tube. Different techniques have been evolved in the past to reduce the contribution from each of the above factors. The usual method of reducing the contribution from external environmental contamination is the use of shielding materials formed from relatviely high atomic number, hence, heavily absorbing materials, such as lead or iron. The internal contamination in the counter materials themselves can be reduced by careful selection of these materials to eliminate those which normally contain a relatively high abundance of natural radioactive isotopes. The heavy shielding used to reduce the contribution from external environmental contaminants also serves to reduce the contribution from the "soft" component of cosmic radiation, that is, gamma ray showers and the like. The hard component of cosmic radiation which contains particles having energies of several billion electron volts is not affected by absorbing materials and the usual technique for reducing this contribution is to use an "anti-coincidence guard counter."

The anti-coincidence guard counter is usually a multiple anode single counter or a multiple formation of counters which surround the detector used to measure the radiations in the experiment (the source counter) and the output of this guard counter is connected to a circuit in conjunction with the output from the "source counter" in such a fashion that a count indication from both the guard and source counter simultaneously is not registered as an output from the overall device. Thus, the highly ionizing high energy primary cosmic radiation will occasion a count in both counters and, hence not be represented in the output. One of the basic problems inherent in the anti-coincidence technique is to insure sufficiently high sensitivity in the guard counter so that even a small percentage of cosmic rays do not enter the source counter without having triggered a pulse output from the guard counter. To insure this efficiency involves problems of matching the response characteristic of both counters in terms of variation with applied high voltage and in the case of multiple guard counters, requires some assurance that all of the guard counters are operating. In addition, the geometrical configuration must be such that 160° coverage is obtained, that is, that the guard counter shields the source counter from all radiation incident upon it at an angle of more than 10° above the horizontal.

Again, in terms of the internal contaminant contribution, even the most careful selection of the materials used in the construction of the source counter does not entirely eliminate the background contribution from this source.

It is, therefore, a primary object of the present invention to provide a simple, extremely low background, anti-coincidence counter system.

It is another object of the present invention to provide a low background, anti-coincidence guard counter system utilizing flow gas counter techniques in both the guard and source counter.

It is yet another object of the present invention to provide a simple, highly efficient, anti-coincidence source counter combination adapted for convenient disassembly and cleaning.

It is still another object of the present invention to provide a source counter-anti-coincidence counter system having an extremely low background and adapted for efficient counting of both low energy and relatively high energy beta particles.

Broadly speaking, the counting system of the present invention employs a nested pair of flow gas counters with the inner counter serving as a source counter and the outer as an anti-coincidence guard counter. A thin window is provided on one surface of the source counter for exposure to the radioactive material to be measured and the remainder of the cathode of the source counter serves as a portion of the cathode of the surrounding guard counter. Flow gas is flowed serially through the center source counter, then the anti-coincidence guard counter before discharge into the atmosphere. The geometric configuration of the source counter, which is formed as a truncated cone with the beta window forming the base of the cone, provides both high efficiency for a single anode guard counter and a minimum practical area for the source counter in terms of contribution from contaminants of the construction materials of the source counter. Since the non-window portion of the cathode of the source counter forms a portion of the cathode of the guard counter, the entire unit is easily assembled and disassembled and virtually eliminates problems of gas flow between the two counters, as well as simplifying the electrical connections.

Other objects and advantages will become apparent from the following detailed description when taken in conjunction with the accompanying drawing in which:

FIG. 1 represents a vertical, cross-sectional view of a counter system in accordance with the principles of this invention;

FIG. 1A is an enlarged view of a portion of FIG. 1; and

FIG. 2 is a cross-sectional view of the counter system of FIG. 1 taken along the line A—A of FIG. 1.

With reference now specifically to the drawing, the source counter, indicated generally at 11, is incorporated within the guard counter indicated generally at 12. The guard counter is formed of a cylindrical housing or envelope 13 which typically would be formed of plastic (or other low activity insulating material) and which has a hollowed out cup-shaped center section 14 forming the counter chamber. The hollowed out section 14 is not precisely hemispherical, but rather is a hemisphere with a short cylindrical extension. The internal surface of the chamber 14 is coated with a thin layer 48 of aluminum, steel (or other low activity conducting material) to render it electrically conducting and thereby form a portion of the cathode of the guard counter. A second electrode 15 is formed as a circular loop of relatively small diameter wire and constitutes the anode of the guard counter. This anode is supported upon a conductive rod 16 which extends through the plastic housing 13 and terminates in electrical connector 17. The surface area of the chamber wall immediately surrounding the entry point of the supporting member 16 is not metalized as is the remainder of the interior surface, but rather is left as an insulator to isolate the anode from the cathode. The source counter 11 has a portion of its cathode formed by a laminated partition 20 which is in the form of a shallow truncated cone with the base at the bottom. The partition 20 is formed of two layers with the upper layer 21 consisting of a thin metallic shell, such as aluminum or steel, while the bottom layer 22 is a plastic shell having a metalized lower surface 49. The partition 20 is supported within the chamber 14 by a plastic tubing 23 which is cemented at one end into the plastic housing 13 and at the other end into and through the laminated partition 20. A flanged metal ring 25 snaps over the bottom lip of the plastic housing 13 and is retained in place by its frictional bearing against an O-ring 26 which typically would be formed of neoprene. The O-ring 26 forms a gas tight seal with the flange. In the center portion of the flanged ring 25, corresponding with the inner dimension of the base of the truncated cone formed by the laminated partition 20, is mounted an ultra-thin window material, such as a resin window with an average weight per unit area of 100–200 milligrams/cm.$^2$. The laminated partition 20 and the flanged ring, which is also formed of metal, constitute the remainder of the cathode section of the guard chamber 12. As will be described in more detail below, the geometric configuration thus formed provides an efficient guard counter for radiation impingent upon it from all angles more than 10° above the horizontal.

As shown specifically in FIG. 1A the interior surface of the resin window 27 is coated with a thin metallic film 28, thus rendering it electrically conductive and this, together with the coated interior surface of the plastic section 22 of partition 20, forms the cathode for the source counter 11. The anode 30 for the source counter is a single, small diameter wire stretched across the interior of the chamber 11 in a plane parallel to the window 27. This anode 30 is supported on conductor 31 within pipe 23 which, therefore, serves as an electrical conduit and an electrical lead is carried through a channel 33 in the housing 13 to a second electrical connector 35. The lamination 20 is electrically connected to the internal surface of the guard chamber 14 by a conducting coating on the outside of pipe 23. The other end of anode 30 is again supported on an insulator 38 mounted in the lamination 20. Alternatively, this anode 30 may be formed as a loop electrode with the loop lying in a plane parallel to the window 27. This configuration is illustrated by the dotted lines in FIG. 2.

Both the source and guard counters are operated as gas flow counters operating in either the Geiger or proportional region. High voltage is applied to the anode of each through their respective electrical connectors and the signals corresponding to counts within the individual chambers are also taken from these same connectors. The appropriate gas is flowed through the gas inlet 40 and tubing 41 to the inlet spout 42 which passes through and is cemented to partition 20. The inlet and tubing are formed of metal thereby forming a ground connection for the wall of chamber 14. The inlet 40 and connectors 35 and 17 are supported on an electrically conducting plate 47 adhered to the upper surface of housing 13. A gas outlet 44 in the partition 20 of the source chamber permits the gas to flow from the source chamber into the guard chamber from whence it is discharged through a single orifice 46 to the outside atmosphere.

The truncated cone form of the partition 20 which forms a portion of the cathode of both the guard counter 12 and the source counter 11 provides a dual advantage in terms of reducing the background counts from the source chamber 11. Thus, for a given diameter window it represents a minimum practical area of cathode for the source counter. The contribution to the residual background count from both gamma particles interacting at the wall of the cathode of the source counter and from residual contamination in the materials of the counter is a function of the cathode area, hence reducing this cathode area to its minimum practical value reduces the contribution to background from these sources. In addition, the geometry of the partition 20 with respect to the guard counter provides for a relatively high electric field density in that portion of the chamber volume near the periphery of the chamber opening and this increased field density provides improved efficiency for radiation particles incident upon the counter in this portion of the volume. With this geometrical configuration and utilizing a loop anode of appropriate diameter, a single anode may be employed (as shown), hence, greatly simplifying both the construction and cleaning of the guard chamber, as well as improving its reliability, since it does not rely upon the simultaneous operation of several anodes.

The partition 20 is laminated in order to provide a low background material, plastic with a thin (less than 50 micrograms/cm.$^2$) coating of metal, as the inner surface of the source counter. The outer metal layer (approximately .062 inch thick) absorbs high energy $\beta$ particles from the source so that they will not trigger the guard counter and, hence, be lost through anti-coincidence.

The flow gas of choice would normally be an organic quench gas in the case of operation in the Geiger region and any one of the conventional proportional gases, such as argon-methane when operated in the proportional region. The utilization of each of these counters as a flow gas counter provides for increased life of the counter over that of a sealed organic quenched counter and, in addition, permits the use of a much thinner beta transparent window, since it need not be vacuum tight. Since neither counter is a sealed tube and since a single partitioning member is employed between them, the entire apparatus may be readily disassembled for cleaning.

The table below lists values of critical dimensions which were employed to construct a counter system. This counter system, shielded within 8 inches of iron and operated at sea level, yielded a background counting rate after anti-coincidencing in a range of .20 to .23 count per minute with an efficiency of 35% for an "infinitely thin" carbon 14 sample.

*Table*

Window diameter 1¼"
Guard counter anode 15;
    Loop diameter ⅜ inch
    Wire diameter .005 inch
Source counter anode:
    Loop diameter ½ inch
    Wire diameter .003 inch
Height of truncated conical section .25 inch While the dimensions listed above gave operating characteristics as cited, these dimensions are not limiting, but rather the invention should be construed as limited only by the spirit and scope of the appended claims.

What is claimed is:

1. A radiation detector system comprising, a generally cup-shaped envelope, the inner surface of said envelope being electrically conducting; a single loop electrode extending into said envelope, said loop electrode being electrically isolated from said inner envelope surface; a metallic flange mounted on the periphery of the open end of said envelope and extending inwardly therefrom, forming a circular window of diameter smaller than said envelope diameter; a thin membrane sealing said window; a partition disposed entirely within said cup-shaped envelope, said partition having a circular opening adjacent to and co-extensive with the periphery of said window, the inner and outer surfaces of said partition being electrically conducting and electrically connected to said inner surface of said cup-shaped envelope; a central electrode extending into the volume enclosed by said partition and said membrane, said central electrode being electrically isolated from said partition inner surface and said loop electrode.

2. Apparatus in accordance with claim 1 and including a gas inlet tube connecting to the volume enclosed by said partition and said membrane and a gas outlet tube connecting to the interior of said envelope, said partition having an opening therein adapted to pass gas from the said partition enclosed volume to the volume between said envelope and said partition.

3. A radiation detector system comprising, a generally cup-shaped envelope; a loop electrode extending into said envelope; a thin conductive film electrode formed as the inner surface of said envelope except in the region of said loop electrode; a flanged member mounted around the periphery of the open end of said cup-shaped envelope and extending inwardly therefrom, forming a circular window in the plane of said opening; a thin membrane sealing said window; a partition having the form substantially of a truncated cone open at the base, said partition being disposed entirely within said envelope, said truncated cone base being disposed adjacent to and having substantially the same diameter as said circular window, the inner and outer surfaces of said partition being electrically conducting and electrically connected to said thin conductive film electrode of said envelope; a central electrode extending within the volume enclosed by said partition and said membrane, said central electrode being electrically isolated from said conducting surfaces of said partition and from said loop electrode.

4. A radiation detector system comprising a first counting chamber having a cathode and an anode; said cathode having the form substantially of a hollow, shallow truncated cone; a beta radiation transparent window forming the base of said truncated cone; a second counting chamber enclosing said first counting chamber except for said beta transparent window, said second counting chamber having an outer envelope serving as a cathode and an inner electrode structure serving as an anode, the outer surface of said first chamber cathode, except for said beta transparent window, serving as a portion of the cathode of said second counting chamber.

5. Apparatus in accordance with claim 4 including means for providing gas flow serially into said first counter chamber, thence to said second counting chamber.

6. Apparatus in accordance with claim 3 including a gas inlet connected to the volume enclosed by said partition and said membrane and a gas outlet connected to the interior of said envelope, said partition having an opening therein permiting gas to flow from said volume enclosed by said partition and said thin membrane to the volume between said partition and said envelope.

7. Apparatus in accordance with claim 1 wherein said partition is formed from a two layer lamination, the inner layer being formed from plastic having a thin electrically conducting layer thereon, the outer layer being formed of metal adapted to absorb substantially all beta particles incident upon it.

8. Apparatus in accordance with claim 4 wherein said cathode of said first counting chamber is formed as a two layer lamination, the inner one of said layers being formed of a plastic having a thin conducting coating thereon and the outer one of said layers being formed of a metal adapted to absorb substantially all beta radiation incident thereon.

9. Apparatus in accordance with claim 1 wherein said central electrode is formed as a loop, said loop lying in a plane parallel to plane of said membrane.

References Cited by the Examiner

UNITED STATES PATENTS

| 2,985,785 | 5/1961 | Softky | 313—93 |
| 2,998,522 | 8/1961 | Martin et al. | 313—93 X |
| 3,012,147 | 12/1961 | Hermsen et al. | 250—83.6 |

GEORGE N. WESTBY, *Primary Examiner.*

V. LAFRANCHI, *Assistant Examiner.*